United States Patent [19]

Mollett et al.

[11] Patent Number: 5,073,234

[45] Date of Patent: Dec. 17, 1991

[54] COMPOSITION AND METHOD OF DEINKING OF RECYCLED CELLULOSIC MATERIAL

[75] Inventors: Christopher C. Mollett, Brighton; Gordon R. Sneddon, Farncombe, both of England

[73] Assignee: Albright & Wilson Limited, Oldbury, England

[21] Appl. No.: 464,341

[22] Filed: Jan. 12, 1990

Related U.S. Application Data

[62] Division of Ser. No. 28,017, Mar. 18, 1987, Pat. No. 4,919,754, which is a division of Ser. No. 731,527, May 7, 1985, abandoned.

[30] Foreign Application Priority Data

May 10, 1984 [GB] United Kingdom ............... 8411888
Aug. 24, 1984 [GB] United Kingdom ............... 8421546

[51] Int. Cl.⁵ ........................................... D21C 5/02
[52] U.S. Cl. ................................... 162/5; 162/164.4; 162/189; 162/191

[58] Field of Search ............... 162/5, 4, 164.4, 164.1, 162/189, 191

[56] References Cited

U.S. PATENT DOCUMENTS

| | | | |
|---|---|---|---|
| 1,601,193 | 9/1926 | Welsh | 162/5 |
| 2,673,798 | 3/1954 | Zündel et al. | 162/5 |
| 3,764,460 | 10/1973 | Miyamoto et al. | 162/5 |
| 4,276,118 | 6/1981 | Quick | 162/5 |

FOREIGN PATENT DOCUMENTS

2086955  5/1982  United Kingdom ............... 162/5

Primary Examiner—David A. Simmons
Assistant Examiner—Thi Dang
Attorney, Agent, or Firm—Frishauf, Holtz, Goodman & Woodward

[57] ABSTRACT

A method for deinking recycled waste cellulosic material such as newsprint includes pulping the waste in the presence of an aqueous dispersion of a resin precursor, curable in said dispersion and curing the resin precursor during the pulping operation.

24 Claims, 3 Drawing Sheets

FIG.3

COMPOSITION AND METHOD OF DEINKING OF RECYCLED CELLULOSIC MATERIAL

This is a division of application Ser. No. 07/028,017 filed Mar. 18, 1987, now U.S. Pat. No. 4,919,754; which is a division of U.S. Ser. No. 06/731,527 filed May 7, 1985 (abandoned).

BACKGROUND

An increasingly large proportion of cellulosic pulp for the paper industry is produced from recycled waste cellulosic material, especially repulped newsprint and magazines. Pulp containing either of these wastes is normally contaminated with pigments derived from the ink, which must be removed in order to obtain adequate brightness.

Conventionally, particles of pigment are removed by froth flotation, using the surfactants naturally present in the pulp in order to promote foaming, or, less commonly, adding extraneous surfactants and/or foam boosters. An alternative is to use various solvents and/or surfactants to wash the pigment out of the pulp. Neither of these processes has proved capable of removing sufficient of the print to provide maximum realisable brightness.

In an attempt to improve the degree of separation of the print, various proposals have been made to agglomerate the print or adsorb it onto relatively large particles which will be more readily separated by flotation, or even by centrifugation or screening. All these proposals have, however, had serious drawbacks which have prevented their adoption commercially, despite the recognised inadequacy of the conventional washing and flotation technology.

THE PRIOR ART

FR 1379252 and U.S. Pat. No. 3,377,234 describe the addition of surfactants to the pulping liquor prior to pulping. This approach does not result in complete separation of print. U.S. Pat. No. 4,013,505 and U.S. Pat. No. 4,147,616 describe the precipitation of calcium soap in the pulper to adsorb the print, followed by centrifugal separation of the resulting curds. This approach is only partially successful.

U.S. Pat. No. 3,846,227 and U.S. Pat. No. 3,963,560 describe the use of N-cyclohexyl pyrrolidone as solvent in the pulping stage, to promote removal of print. The process requires relatively high temperatures of about 73° C., which substantially increases the energy cost of the process. and causes unacceptable solvent losses.

GB 2080354 has proposed the addition of polymers to pulp at temperatures above their softening point in order to remove adhesives from recycled pulp. High temperatures are required, and efficient deinking is not alleged.

THE PROBLEM

Waste paper pulp is a chemically and physically complex system which is highly variable in an unpredictable manner. Little is known about the mechanism by which known deinking processes operate. The approach has hitherto been largely empirical.

We have therefore set out to discover the reasons for the inadequate performance of prior art processes.

By far, the major pigment present in repulped paper, and the one with the greatest effect on the final brightness, is carbon black, which is also one of the more intractable in its response to deinking processes. In the following discussion reference is specifically made to carbon black. The comments are, however, generally applicable to other pigments.

We believe, without wishing to be bound thereby, that carbon black is present in print, especially in newspapers, as particles weakly held in an oily matrix. During pulping we believe that this disintegrates, releasing small particles which lodge in the fibrillar surface of the fibres. We believe that the particles, once entrapped, are particularly difficult to remove by known deinking technology.

THE INVENTION

We have now discovered that substantially improved deinking can be obtained by pulping waste paper in an aqueous suspension of a non-fibre-substantive, room temperature vulcanisable resin, and curing the resin in situ. We believe that, in our invention, any pigment particles may become rapidly coated with uncured or partially cured resin, which inhibits disintegration and subsequent redeposition onto the cellulosic fibres, and which on curing, causes the particles to form agglomerates, which are relatively resistant to comminution and are separable from the pulp by conventional means such as washing, flotation, centrifugation or screening.

According to one embodiment, our invention provides an aqueous dispersion of at least one fluid, non-fibre-substantive resin precursor, curable in aqueous dispersion, and sufficient of a curing catalyst to effect curing of the composition, in the dispersion.

Preferably the composition contains a dispersant for the resin precursor. We have further discovered that the proportion of the curable resin required can be substantially reduced by admixing the composition with an inert extender or diluent, thereby improving the economics of the process.

According to a second embodiment, our invention therefore provides a composition comprising from 10 to 85% by weight thereof, of a fluid, non-fibre-substantive resin precursor, curable in aqueous dispersion, at least 5% by weight of the composition of an inert, non-fibre-substantive, fluid diluent and an effective amount of a dispersant for the composition.

According to a further embodiment, our invention provides a method of pulping recycled cellulosic material, contaminated with print, which comprises macerating the material in an aqueous dispersion containing sufficient of a fluid, non-fibre-substantive, resin precursor, curable in said dispersion, to facilitate subsequent deinking, and curing said resin precursor during said maceration.

THE RESIN PRECURSOR

The resin precursor according to our invention may be any non-fibre-substantive fluid which is curable in aqueous suspension, and preferably in aqueous alkaline suspension. In particular it is desirable that the precursor should be curable at temperatures below 50° C., preferably at room temperature. The resin precursor is preferably a sufficiently hydrophobic material not to be readily adsorbed onto the cellulosic fibres, but is desirably compatible with the print. Typically the resin precursor comprises a mixture of a fluid, prepolymer having at least two reactive functional groups per molecule and a cross linking agent able to react with the functional groups, at least in the presence of a suitable catalyst. Where the polymer system is capable of curing in the pulper, in the absence of a catalyst, the resin precursor will normally be formed in situ, the cross linking agent being added to the prepolymer on or shortly before addition to the pulper.

Most preferably, the resin is a room temperature vulcanisable organopolysiloxane. Particularly suitable are mixtures of a dihydroxy poly (dialkylsiloxane) polymer with a poly (alkylhydrosiloxane) cross-linking agent. Preferably, the alkyl groups in each case are lower (e.g. 1 to 4 carbon) alkyl groups, typically methyl groups. An alternative curable resin system for use according to the present invention comprises an oligomeric hydroxy acrylate prepolymer cross linked with a diisocyanate, e.g. a hydroxy ethyl acrylate resin mixed with 1,6-hexamethylene diisocyanate.

Typically the prepolymer has a mean molecular weight of from 5,000 to 70,000 preferably from 10,000 to 50,000 e.g. 30,000 to 45,000. We particularly prefer prepolymers comprising a wide spread of molecular weights e.g. a mixture of a short chain prepolymer M.W. 3,000 to 12,000 a long chain prepolymer M.W. 50,000 to 70,000.

The cross-linking agent typically has a mean molecular weight of from 1,000 to 5,000. Typically the cross-linking agent is present in a proportion of from 1:10 to 10:1; preferably from 1:2 to 2:1, most preferably 3:4 to 4:3 e.g. 1:1 by weight based on the difunctional polymer.

THE DISPERSANT

Any surfactant or dispersant which is water soluble or miscible and also miscible with the relatively hydrophobic resin precursor may be employed. Examples of dispersants for organo polysiloxane resin precursors are non-ionic surfactants such as polyalkoxylated organopolysiloxanes, e.g. a poly (dimethylsiloxane) poly (ethyleneglycol) ether, and poly ethoxylated sorbitan monoalkanoates, and cationic surfactants. Anionic surfactants are less preferred.

Particularly preferred, however are film forming dispersants and especially polymeric protective colloids such as polyvinyl alcohol, carboxymethylcellulose, polyvinylpyrrolidone or cellulose acetate.

The proportion of dispersant is sufficient to form a stable dispersion for the resin precursor in water. Amounts in excess of the minimum required to disperse the resin precursor are preferably avoided on economic grounds. Typically the dispersant is present in a proportion of from 0.1 to 20% by weight of the resin precursor, e.g. 3 to 7%. We do not exclude the possibility of dispersing the resin precursor without a dispersant, or using the dispersant action of normal components of the pulp adventitiously present in the pulper.

THE DILUENT

The diluent is optionally, present in any proportion up to about 95% by weight of the composition, preferably 5 to 90%, e.g. 55 to 80%, especially 65 to 75%.

The diluent may be any inert oil which is sufficiently hydrophobic to be non-fibre-substantive, and to be miscible with the resin precursor. Typical examples of diluents include polydimethylsiloxanes with terminal methyl groups and hydrocarbon oils. The diluent is preferably sufficiently fluid for the composition to be pourable, but sufficiently viscous to provide effective protection to particles of print in the pulp to prevent comminution and/or entrapment in the early stages of pulping and to ensure a mechanically strong cured agglomerate.

THE CATALYST

The catalyst may be any catalyst capable of catalysing the curing of the resin precursor in aqueous suspension, preferably at room temperature. Particularly preferred are organotin catalysts such as the dialkyltin dialkanoates. Preferably the two alkyl groups are lower alkyl groups having, for example, 2 to 4, preferably 4, carbon atoms and the two alkanoyl groups have from 2 to 20 carbon atoms, preferably 8 to 14, e.g. dibutyltin bis (ethylhexanoate) or dibutyltin dilaurate.

The activity and the volatility of the catalyst increase with decreasing carbon number of the alkanoyl groups. We prefer a catalyst which is sufficiently active to cure the resin precursor fully within the normal pulping period, e.g. 15 to 40 minutes. More active catalysts, e.g. dibutyltin diacetate, although operative are less preferred.

The catalyst may be used as a solution in an organic solvent such as trichlorethylene, but we prefer to use aqueous based emulsions of catalyst, which are commercially available and which have been found to give better activity in the aqueous pulping liquor.

In general we believe that the brightness of the pulp tends to reach a peak at the completion of the curing period and may thereafter decline if pulping is continued. We therefore prefer catalysts which give a curing time approximately equal to the pulping time rather than those which give substantially complete curing at an early stage in the pulping process.

We prefer to use a catalyst, even with systems which are capable of curing in the absence of a catalyst at the temperatures obtaining in the pulper, although it is not essential to our invention.

THE PULPING LIQUOR

Preferably the resin precursor is dispersed in water, in the presence of the catalyst (or of added cross linking agent, where no catalyst is required) and allowed to precure for a short period, e.g. 10 secs to 5 minutes, preferably 0.5 to 1 minutes and at a pH of preferably 8 to 12, before adding the waste. Typically the precure is from 1 to 10% of total curing time. Preferably the resin precursor is used in a proportion of 0.1 to 10% based on the weight of pulp solids, more preferably 1 to 5%, e.g. 1.5 to 4%.

The catalyst may be present in a proportion of from 0.1 to 50% based on the weight of resin precursor, preferably 0.5 to 20%, e.g. 1 to 10%.

The pulping liquor is preferably alkaline. Typically the pulper contents should have a pH of 8 to 12.5, e.g. 9 to 10. This may be achieved using for example sodium hydroxide, sodium carbonate, sodium silicate or mixtures thereof. The resin precursor and catalyst may be suspended directly in the pulping liquor, or alternatively a more concentrated suspension may be prepared and added to the pulping liquor shortly before pulping.

THE PULPING OPERATION

The furnish for the pulp may comprise newsprint and/or magazines and/or other ink contaminated cellulosic wastes. The furnish preferably comprises a mixture of newsprint and magazines, e.g. comprising 10 to 60% by weight of magazines. However the process is operable with 100% newsprint, a furnish that is particularly difficult to deink satisfactorily with existing technology.

The waste is macerated with the pulping liquor for from 10 to 60 mins, preferably 15 to 40 mins, at temperature which may typically be in the range 5° to 60° C., preferably 20° to 50° C., e.g. 35° C. The pulp may contain from 2 to 25% solids more usually 5 to 15%.

SEQUESTRANTS

We have discovered that the brightness of pulp deinked according to our process is substantially enhanced by the presence in the pulping liquor of a sequestrannt for alkaline earth metal and especially for calcium, e.g. ethylenediamine tetracetic acid; or phosphates, condensed phosphates or phosphonates, especially sodium tripolyphosphate, or silicates. This constitutes a preferred aspect of our invention. We prefer that the sequestrant should be present in amounts up to the stoichiometric amount based on the total sequesterable alkaline earth metal ion present in the pulp.

MISCELLANEOUS ADDITIVES

It is desirable that the cured resin particles should have a physical form such that they are readily separable from the pulp. For example they may differ substantially in density from the aqueous medium, preferably being substantially lighter, to facilitate centrifugal separation or they may be of a sufficient size to permit effective screening. The former may be achieved for example by selection of a low density extender, or by incorporating a blowing agent into the resin precursor. The latter may be a volatile liquid such as a fluorocarbon which is evaporated by the exothermic curing reaction to form expanded particles.

Alternatively, either the size or the density may be controlled by the addition of solid particles or granules of polymer. Preferably the particles are of a low density material such as expanded polystyrene and/or are of a sufficient size to be separable by screening. They preferably have a surface upon which the resin precursor and pigment will readily coagulate.

We have found in particular that separated coarse particles, either of an added polymer with print agglomerated on the surface, or of the cured agglomerated resin itself, can advantageously be recycled to the pulper in order to provide a more complete separation of the agglomerated print.

According to a further embodiment of our invention, therefore, recycled cellulosic material, contaminated with print, is repulped in a pulper in the presence of a dispersed curable resin which is non-substantive to the cellulose, but substantive to the print, in conditions adapted to effect curing of the resin and agglomeration of the print thereby; pulp is withdrawn from the pulper; cured resin is separated from the pulp; and a part of the cured resin is recycled to the pulper.

Surfactants, foam stabilizers or anti-foams may be added to the pulper, or subsequently, to promote or control foaming.

SEPARATION

The coagulated print may be separated from the pulp using any of the known procedures, depending upon the physical form of the cured particles.

The particles may be separated using conventional froth flotation. If necessary foam boosters and/or inhibitors may be added to the pulp to regulate the degree of foaming. Alternatively the agglomerated print may be removed by washing e.g. by dewatering and reslurrying the pulp.

If the particles differ sufficiently in density from the pulp they may be separated centrifugally, while sufficiently large particles may be separated by screening.

Typically, the pulp is diluted to a solids content of less than 2% by weight and screened to remove large particles. Any ink containing particles remaining in the pulp may then be separated by washing, centrifugation and/or flotation.

The invention will be illustrated by the following Examples:

Except where stated to the contrary, the examples used the following conditions:
Resin precursor:
  50% by weight hydroxy-functional polydimethylsiloxane
  45% by weight Si-H functional polydimethylsiloxane prepolymer
  5% by weight polyethyleneoxy-/polypropyleneoxy-functional polydimethylsiloxane.
Pulper consistency: 4%
Initial pulper pH: 10.5
Initial pulper temperature: 30° C.
Pulping time: 25 minutes.
Resin addition level: 2% on fibre by weight.
Method of addition: resin mixture added to water and dispersed prior to addition of fibre, caustic soda and catalyst.
Furnish: 100% newsprint.

EXAMPLE 1

Using 0.2%, by weight of fibre, of sodium dibutyltin dilaurate as catalyst in a laboratory test run, the ex-pulper brightness was 49% compared with 41% in the absence of resin.

EXAMPLE 2

Example 1 was repeated using 100% magazines in place of newsprint. Ex-pulper brightness was 57% compared with 54% in the absence of resin.

EXAMPLE 3

Example 1 was repeated using 50% by weight newsprint, 50% magazines as furnish. Ex-pulper brightness was 52% compared with 47% in the absence of resin.

EXAMPLES 4–6

Using 1.5%, by weight of fibre, of different catalysts results were:
  No resin—45% brightness;
  Example 4—dibutyltin diacetate 55.5% brightness;
  Example 5—dibutyltin dilaurate 56.5% brightness;
  Example 6—dibutyltin bis (2-ethylhexanoate) (in ethanol) 58% brightness.

EXAMPLE 7

Figure 1:
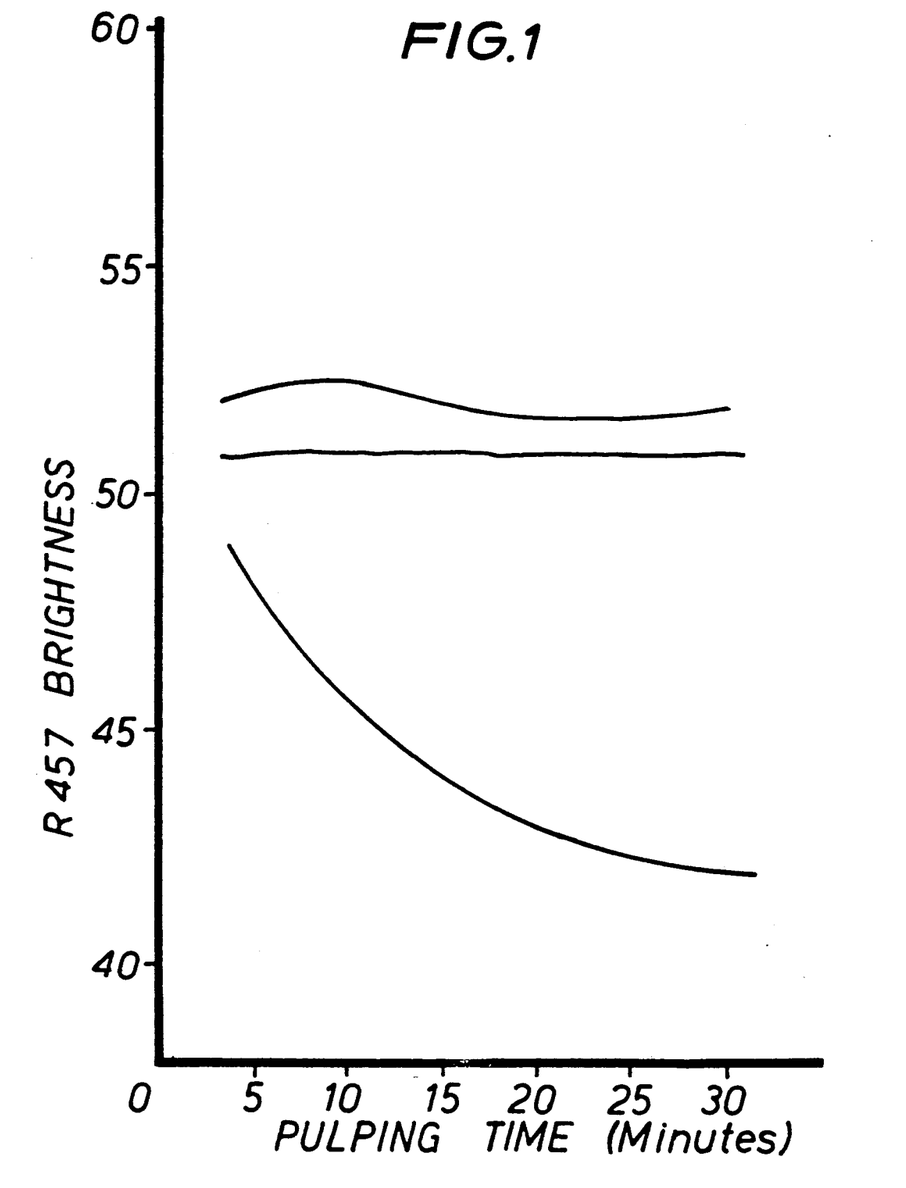

FIG. 1 represents the variation in pulp brightness with time in a mill trial, using dibutyltin diacetate catalyst with 1 ton of newsprint, at a consistency of 12 to 15%. The lowest curve is a comparative run with no resin added. The middle curve is with 2% resin and 0.25% catalyst, based on the weight of fibre, and the highest curve is with 4% resin and 0.5% catalyst based on the weight of fibre.

EXAMPLE 8

Figure 2:
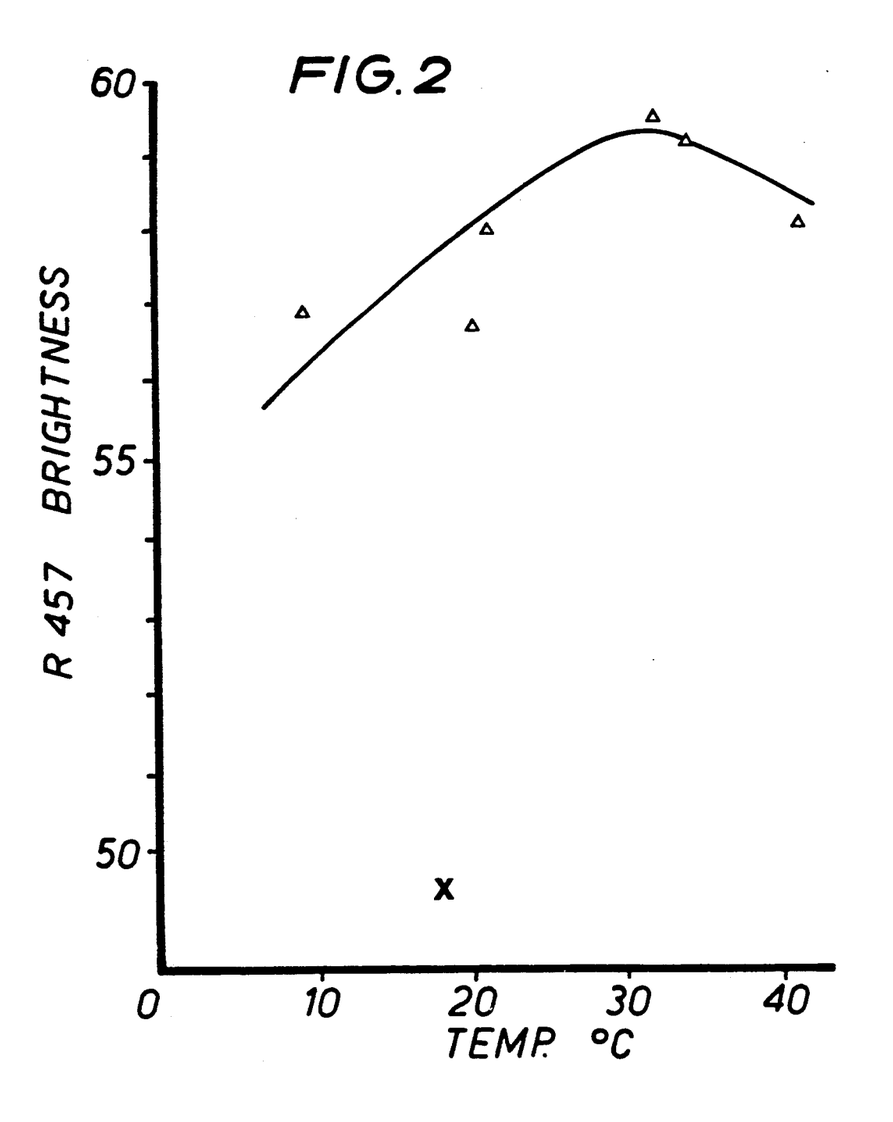

FIG. 2 shows the effects of varying temperature on 6 experimental runs using 4% resin and 1.5% by weight dibutyltin diacetate based on the weight of fibre.

EXAMPLE 9

Figure 3:
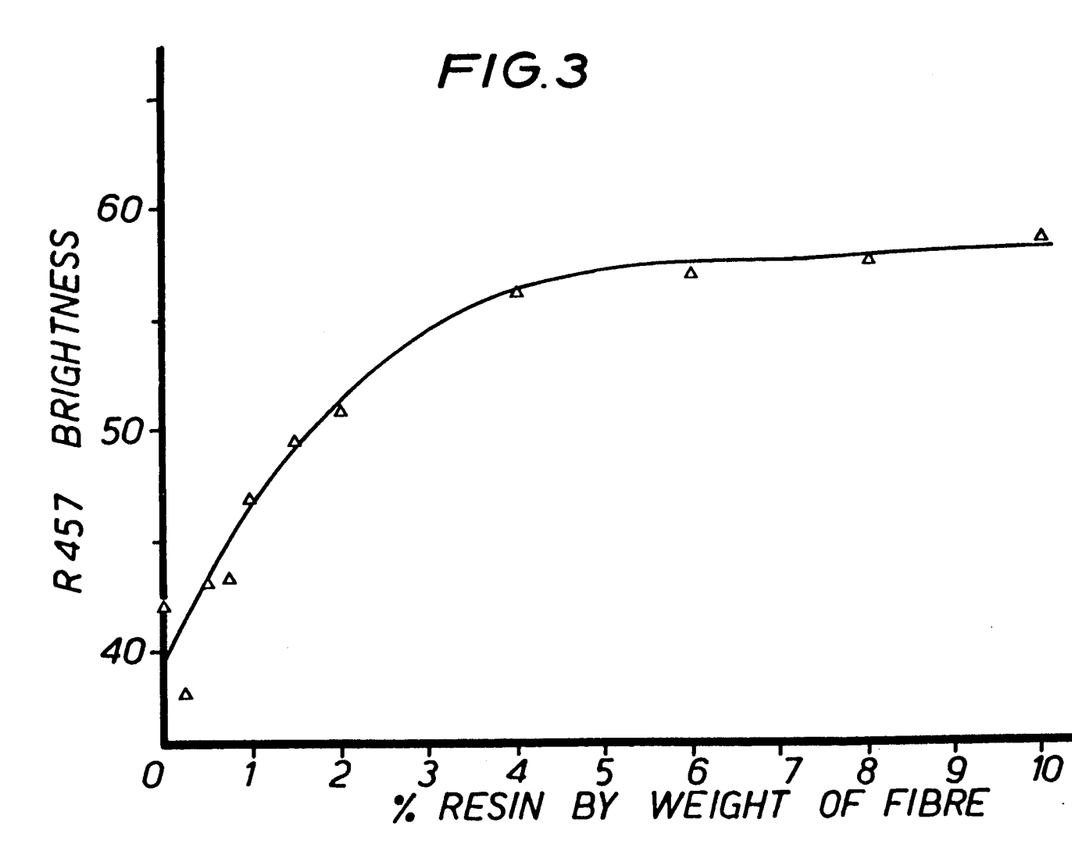

FIG. 3 shows the effect of increasing resin concentration using 1.5% by weight of dibutyltin diacetate based on the weight of fibre.

EXAMPLE 10

Example 1 was repeated adding expanded polystyrene beads of from 1 to 10 mm. diameter to the dispersed resin precursor immediately prior to the addition of the fibre. The beads were readily separated from the pulp and gave a substantial improvement in agglomeration and separation of the print. Optimum results were obtained with 1–2 mm. beads. The separated beads were recycled to the pulper and the experiment repeated. The recycled beads provided a substantially equivalent improvement in the agglomeration of the print to that provided by the original uncontaminated beads.

EXAMPLE 11

Example 1 was repeated. Particles of agglomerated print were separated from the pulp and 50% of the separated particles were recycled to the pulper and the example repeated again. On the second run improved agglomeration and easier separation was observed.

EXAMPLES 12 AND 13

An acrylic resin precursor was used in the Examples 12 and 13 consisting of

| wt % | Substance | Function | Carrier | Trade Mark |
|---|---|---|---|---|
| 65 | hydroxyethyl-acrylate | prepolymer | 50% in butyl-acetate | "DURASOL" 346 |
| 30 | hexamethylene-1,6-diisocyanate | cross linker | xylene | "DESMODUR" N75 |
| 5 | ethylene glycol/propylene glycol hydroxymethyl siloxane copolymer | dispersant | | "GLYCOL B" |

This was compared with the silicone resin precursor of Example 1 as follows:

EXAMPLE 12

| Furnish | 100% News | |
|---|---|---|
| Catalyst | Dibutyltindilaurate (1% on fibre addition) | |
| Brightness R$_{457}$ | Ex-pulper | Infinite wash |
| Caustic only | 37 | 49 |
| 3% Acrylate/caustic | 45 | 51½ |
| 2% Silicone/caustic | 47 | 55½ |

EXAMPLE 13

| Furnish | 50/50 News/magazines | |
|---|---|---|
| Catalyst | Dibutyltindilaurate (1% on fibre addition) | |
| Brightness R$_{457}$ | Ex-pulper | After flotation |
| Caustic only | 50 | 54½ |
| 2% Acrylate RTV/caustic | 52 | 63½ |
| 2% Silicone RTV/caustic | 56 | 62 |

EXAMPLE 14

To illustrate the effects of including a non-functional extender in the resin example 1 was repeated adding various proportions of methyl functional polydimethyl siloxane to the reactive prepolymer, with the following results:

| % by wt. reactive prepolymer | Ex pulper brightness |
|---|---|
| 95 | 51.5 |
| 45 | 51.8 |
| 25 | 51.9 |
| 10 | 50.0 |
| Comparative (no resin) | 40.7 |

EXAMPLE 15

A prepolymer emulsion was prepared comprising:

| Dihydroxy poly(dimethyl siloxane) | n = 49–144 (mean MW = 7566) | 10 g |
|---|---|---|
| Dihydroxy poly(dimethyl siloxane) | n = 850 (mean MW = 63066) | 40 g |
| Poly(methyl hydrosiloxane) | n = 40 (mean MW = 2562) | 45 g |
| 5% aqueous solution of polyvinyl alcohol | | 165 g |

A catalyst emulsion having 33% by wt. of solids was prepared separately containing:

| dibutyl tin dilaurate | 60 g |
|---|---|
| polyvinyl alcohol | 7 g |
| water | 133 g |

1900 ml of water and 6 g prepolymer emulsion (1% resin based on the weight of fibre) were stirred in a pulper with 13 ml concentrated sodium hydroxide solution and 0.3 ml of the catalyst emulsion (0.05% based on the weight of fibre) at room temperature for a 30 second precure period. 2.36 gm of waste newsprint were then added to provide a pulp having a consistency of 11%.

After 25 minutes pulping the pulp was washed and compared with a control run using sodium hydroxide solution only.

| | Ex pulper brightness | Washed brightness |
|---|---|---|
| Control | 36.5 | 42.8 |
| Example 15 | 46.3 | 51 |

We claim:

1. A method of making pulp from recycled cellulosic pulp material contaminated with print, which comprises macerating the material in an aqueous dispersion containing a fluid, non-fiber-substantive, resin precursor which is curable in the dispersion, the resin precursor consisting essentially of a mixture of a fluid prepolymer having at least two reactive functional groups per molecule and a cross-linking agent capable of reacting with the functional groups, the resin precursor being present in an amount effective to facilitate subsequent de-inking of the contaminated pulp, curing said resin precursor and agglomerating print with said cured resin during said maceration and separating the cured resin from the pulp.

2. The method according to claim 1, the method further comprising, prior to macerating, the steps of
    forming an initial aqueous dispersion of the resin precursor and a catalyst in a quantity effective to cure the resin precursor in the initial aqueous dispersion, allowing the initial aqueous dispersion to precure for up to 20 minutes, and adding the initial aqueous dispersion to the cellulosic material as said aqueous dispersion in the macerating step.

3. The method of claim 2, wherein said prepolymer is dihydroxypoly(dialkylsiloxane) polymer and said crosslinking agent is a poly(alkyhydrosiloxane).

4. The method of claim 3, wherein each alkyl group of said prepolymer and of said crosslinking agent has from 1 to 4 carbon atoms.

5. The method of claim 4, wherein said alkyl groups of said prepolymer and said crosslinking agent are methyl groups.

6. A method according to claim 2, wherein the prepolymer is an oligomeric hydroxy acrylate prepolymer and wherein the crosslinking agent is a di-isocyanate.

7. A method according to claim 6, wherein said crosslinking agent is present in a proportion of from 1:10 to 10:1 by weight based on the prepolymer.

8. The method of claim 2, wherein the catalyst is a dialkyl tin dialkanoate, each alkanoate moiety having from 8 to 14 carbon atoms and said catalyst is present in an amount of 0.1 to 50 wt. % based on the weight of the resin precursor.

9. The method according to claim 1 wherein the resin precursor is used in a proportion of from 0.1–10% based on the weight of pulp solids.

10. The method according to claim 9 wherein said dispersion has a pH of from 8 to 12.5 during said maceration.

11. The method of claim 1, wherein the dispersion further comprises a dispersant.

12. The method of claim 11, wherein the dispersant is selected from the group consisting of polyalkoxylated organopolysiloxanes, polyethoxylated sorbitan monoalkanoates, cationic surfactants, polyvinyl alcohol, carboxymethylcellulose, polyvinylpyrrolidone and cellulose acetate, said dispersant being present in an amount of 0.1 to 20% by weight of the resin precursor.

13. The method of claim 1, wherein said resin precursor is curable at temperature below 50° C.

14. The method of claim 13, wherein said resin precursor is curable at room temperature.

15. The method according to claim 1 wherein said cellulosic material is macerated in said dispersion for from 10 to 60 minutes at a temperature of from 5° to 60° C. at a solids content of 2–25%.

16. The method according to claim 1, wherein the dispersion has a pH of from 8 to 12.5 during the maceration.

17. The method according to claim 1, wherein the cellulosic material is macerated in said dispersion for from 10 to 60 minutes at a temperature of from 5° to 60° C. at a solids content of from 2 to 25%.

18. The method according to claim 18, wherein the dispersion contains a sequestrant for calcium ions.

19. The method according to claim 18, wherein the resin precursor contains a blowing agent.

20. The method according to claim 18, wherein the pulp contains solid particles of polymer.

21. The method of claim 1, wherein said resin precursor is admixed with an inert, non-fiber substantive, fluid diluent to form a mixture comprising 10 to 85 weight % of said resin precursor and at least 5 weight % of said diluent.

22. A method of de-inking recycled cellulosic fiber pulp material contaminated with print pigment, the method comprising the steps of macerating the recycled cellulosic material in an aqueous dispersion containing a fluid, non-fiber-substantive resin precursor which is curable in the dispersion, the resin precursor consisting essentially of a mixture of a fluid prepolymer having at least two reactive functional groups per molecule and a cross-linking agent capable of reacting with the functional groups and being present in an amount effective to facilitate subsequent de-inking of the contaminated pulp, curing the resin precursor during the maceration in order to form solid agglomerates comprising cured resin and at least some of the contaminating pigment, and separating the cured and agglomerated resin containing contaminating pigment from the pulp.

23. The method according to claim 22, further comprising the steps of returning a part of the separated agglomerated resin to the recycled cellulosic pulp and further macerating the pulp in the presence of the recycled separated agglomerated resin.

24. A method of making pulp comprising repulping recycled cellulosic material contaminated with print in a pulper in the presence of a dispersed curable fluid precursor of a resin which is non-substantive to the cellulose, but substantive to the print, in conditions to effect curing of the resin and agglomeration of the print thereby, the resin precursor consisting essentially of a mixture of a fluid prepolymer having at least two reactive functional groups per molecule and a cross-linking agent capable of reacting with the functional groups;

withdrawing pulp from the pulper;

separating cured resin from the pulp; and recycling a part of the cured resin to the pulper.

* * * * *

UNITED STATES PATENT AND TRADEMARK OFFICE
CERTIFICATE OF CORRECTION

PATENT NO. : 5,073,234

DATED : December 17, 1991

INVENTOR(S) : MOLLETT et al

It is certified that error appears in the above-identified patent and that said Letters Patent is hereby corrected as shown below:

On the title page, item [56], under U.S. PATENT DOCUMENTS", insert

```
--3,098,833     7/1963      Solomon et al.......528/19
  3,377,234     4/1968      Illingsworth........162/5
  3,431,143     3/1969      Johnson et al.......162/164.4
  3,706,695    12/1972      Huebner et al.......528/18
  3,846,227    11/1974      Mestetsky et al.....162/5
  3,900,617     8/1975      Grenoble............528/31
  3,963,560     6/1976      Mestetsky et al.....162/5
  4,013,505     3/1977      Balcar et al........162/5
  4,076,578     2/1978      Puddington et al....162/5
  4,147,616     4/1979      Balcar et al........209/12
  4,221,688     9/1980      Johnson et al.......524/251
  4,428,751     2/1981      Willing.............428/447
  4,277,382     7/1981      Lin et al...........428/378
  4,288,356     9/1981      Huebner et al.......524/501
  4,447,498     5/1984      Fink et al..........162/164.4--.
```

UNITED STATES PATENT AND TRADEMARK OFFICE
CERTIFICATE OF CORRECTION

PATENT NO. : 5,073,234

DATED : December 17, 1991

INVENTOR(S) : MOLLETT et al

It is certified that error appears in the above-identified patent and that said Letters Patent is hereby corrected as shown below:

On the title page, item [56], under "FOREIGN PATENT DOCUMENTS" insert

```
--0 026 616      4/1981     European
  2 005 288      4/1979     Great Britain
    804 198     11/1958     Great Britain
    939 532     10/1963     Great Britain
  2 080 354      2/1982     Great Britain
  1 379 252      5/1986     France
  1 920 590     12/1969     Germany  --.
```

Signed and Sealed this

Thirtieth Day of August, 1994

*Attest:*

BRUCE LEHMAN

*Attesting Officer*     *Commissioner of Patents and Trademarks*